UNITARY FLOOR SCRUBBING AND DRYING APPLIANCE

Original Filed April 12, 1957 3 Sheets-Sheet 1

UNITARY FLOOR SCRUBBING AND DRYING APPLIANCE

Original Filed April 12, 1957 3 Sheets-Sheet 2

UNITARY FLOOR SCRUBBING AND DRYING APPLIANCE

Original Filed April 12, 1957 3 Sheets-Sheet 3

United States Patent Office

Re. 25,939
Reissued Dec. 14, 1965

25,939

UNITARY FLOOR SCRUBBING AND DRYING APPLIANCE

Don C. Krammes, Canton, Ohio, assignor to The Hoover Company, North Canton, Ohio, a corporation of Ohio Original No. 3,117,337, dated Jan. 14, 1964, Ser. No. 652,565, Apr. 12, 1957. Application for reissue May 14, 1965, Ser. No. 459,517
10 Claims. (Cl. 15—320)

Figures 1, 2:
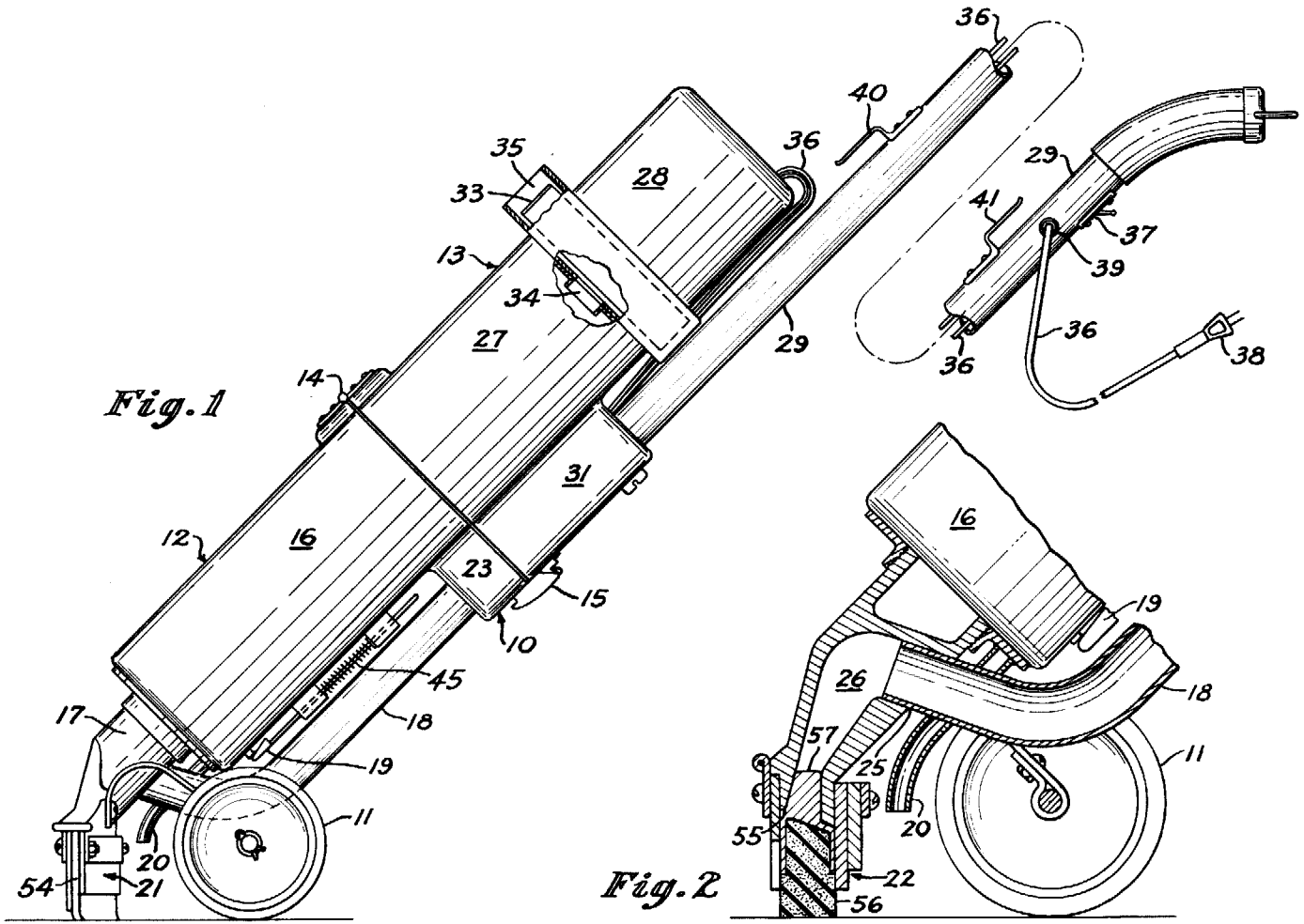

Matter enclosed in heavy brackets [ ] appears in the original patent but forms no part of this reissue specification; matter printed in italics indicates the additions made by reissue.

The present invention relates to floor scrubbers and more particularly to a unitary appliance which may be used to apply a detergent solution to the floor, scrub the floor with the solution and thereafter remove the dirty solution from the floor.

According to the invention, the entire unit is mounted on an elongated handle having a pair of supporting and transporting wheels secured to its lower end, a combined function receptacle including a detergent solution dispensing device and dirty solution collecting device mounted immediately above the wheels, an air-solution separating chamber above the combined function receptacle and a motor-fan suction unit above the separating chamber.

Forwardly of the wheels is a convertible nozzle which may be used for scrubbing the floor as the detergent solution is applied or alternatively to pick up the dirty solution after the scrubbing operation. The convertible arrangement is in the form of a suction nozzle to which is applied a squeegee unit for picking up the dirty solution, which may be replaced by a scrubbing unit in the form of a sponge or brush which, when applied, preferably closes off the suction nozzle.

The lower part of the handle is hollow and acts as a suction tube leading to the separation chamber. A manually actuatable valve is provided in the lower rear corner of the solution container and a dispensing tube leads to a point above and to the rear of the suction nozzle for dripping detergent solution onto the floor when the valve is open.

The combined function receptacle is in the form of a container which is used for storing the clean detergent solution. Removably supported in the upper end of the casing is an open ended collapsible plastic bag for collecting the dirty detergent solution from the separator.

The provision of the collapsible bag within the clean detergent dispensing container reduces the size of the apparatus necessary for dispensing the clean detergent solution and collecting the dirty detergent solution. When the device is first put into use the dispensing container is substantially filled with clean detergent solution and the collapsible plastic bag merely floats on top of solution. As the clean detergent is dispensed the liquid level in the dispensing container will fall and the bottom of the collapsible plastic bag will follow. Then when the device is used to pick up dirty solution, the dirty solution will be deposited within the bottom of the collapsible bag and occupies the space formerly occupied by the clean detergent solution. Thus the volume of the dispensing container need only be large enough to contain the original charge of clean detergent solution.

In order to provide for the easy removal and replacement of the dirty solution bag, the separator casing is hinged to the top of the combined function receptacle.

The upper end of the combined function receptacle and the lower end of the separator casing are provided with enlargements for that purpose, for the purpose of forming a suction passage from the suction tube of the lower handle section to the separator interior and for the purpose of forming a socket for the upper part of the handle.

According to the invention the handle is formed by the lower handle section which forms a suction passage, the two enlargements and the upper handle section.

Figure 3:
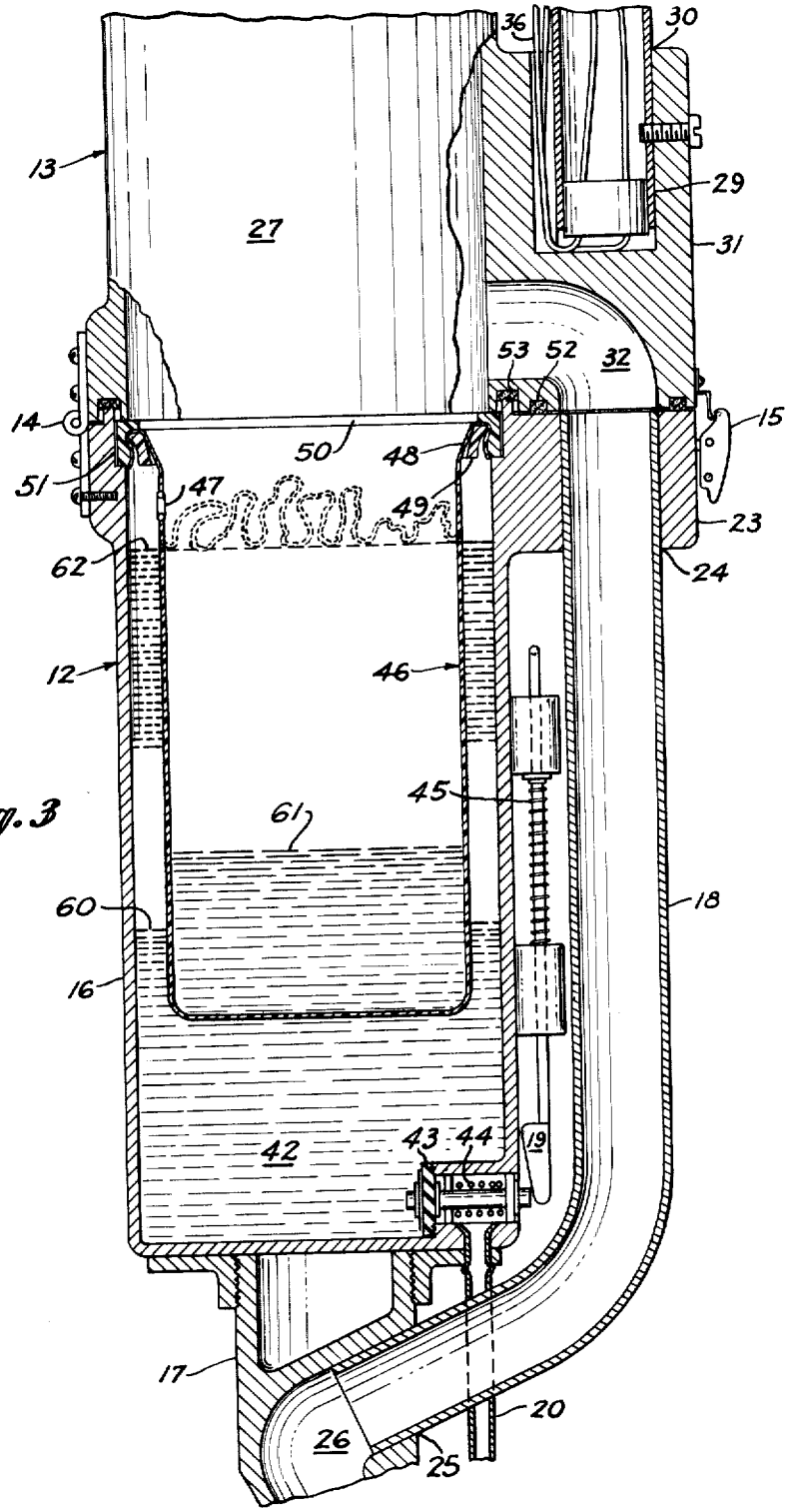
Figure 4:
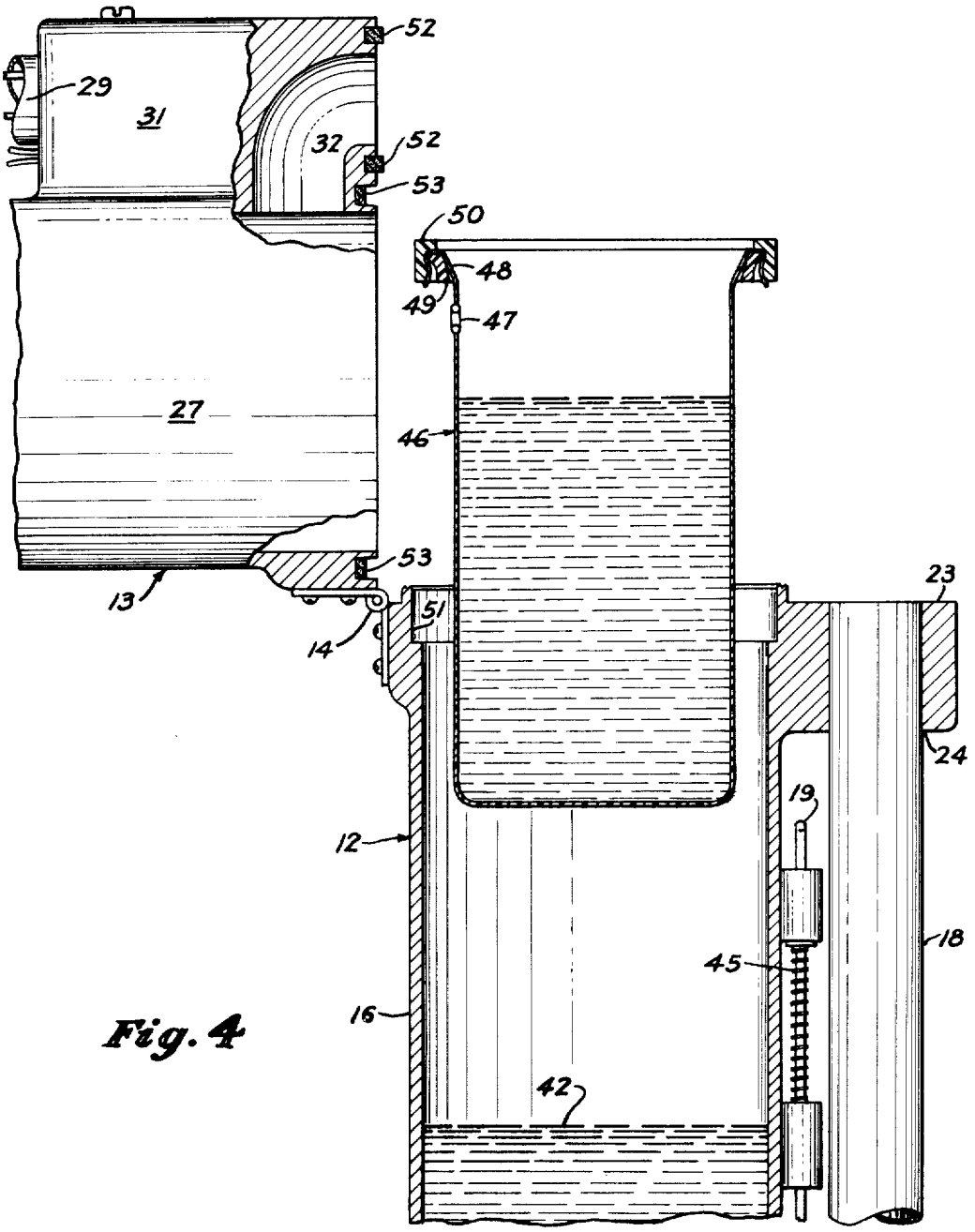

Other objects and advantages of the present invention will become apparent as the description proceeds when taken in connection with the accompanying drawings in which:

FIG. 1 is a side elevation of the floor scrubber of the present invention with the squeegee unit in place, FIG. 2 is a segmental view partially in section to show the details of construction and showing the scrubbing unit in place, FIG. 3 is a cross sectional view showing the details of the combined function receptacle of the present invention, and FIG. 4 is a partially exploded view showing how the dirty solution bag may be removed.

Referring to FIG. 1 of the drawing, the floor scrubber, generally indicated by the reference numeral 10, is mounted for ambulatory movement on wheels 11 and comprises two sections 12 and 13 hinged together at 14 and held in assembled relationship by any suitable latch mechanism 15.

The section 12 includes the dual function receptacle 16, the suction nozzle 17, the suction tube 18, which forms the lower portion of the handle of the device, a valve actuator 19, a dispensing tube 20, the wheels 11 and a squeegee unit 21 or alternatively, a scrubber unit 22 shown in FIG. 2. The upper end of the container 16 includes an enlargement 23 having a bore 24 in which the upper end of the suction tube 18 is positioned preferably by a press fit connection. The lower end of the suction tube 18 is press fitted into a bore 25 in the suction nozzle 17 and communicates with the suction passage 26 thereof as shown in FIGS. 2 and 3.

The upper section 13 includes an air and water separator including a casing 27, a motor fan unit 28 and the upper section 29 of the handle which is received in the bore 30 of an enlargement 31 of the casing 27. As shown in FIG. 3, a suction passage 32 is formed in the enlargement 31 which connects the suction tube 18 with the interior of the air and water separator which may be of any suitable construction known in the art.

The motor fan unit 28 includes a fan 33 having a suction eye 34 communicating with the interior of the air and water separator 27 and an exhaust outlet 35 for dry air.

The motor fan unit 28 is adapted to be energized from an electric supply outlet by means of electric conductors 36 including a switch 37 and a connector plug 38. The conductors 36 extend from the motor fan unit 28 downwardly into the bore 30, enter the lower end of the upper handle section 29, as shown in FIG. 3, extend upwardly through the upper handle section 29 to switch 37 and continue through an outlet 39 in the wall of the upper handle section 29 to the plug 38. Keepers 40, 41 may be provided for storing the conductor cord 36 when the unit is not in operation.

The dual function receptacle 16 forms a reservoir for storing the clean detergent solution 42 which is adapted to be dispensed to the floor through tube 20 by means of a valve 43 which is spring biased to closed position by spring 44. The valve 43 is adapted to be opened and closed by valve actuator 19 which is spring biased to valve closing position by a spring 45. The slope on the valve actuating surface of valve actuator 19 is such that when pressed downwardly the frictional resistance between the actuator 19 and the stem of the valve 43 will be sufficient to hold the valve 43 open. It is to be noted that the opening action of valve actuator 19 is selective in that the valve 43 may be opened to varying degrees because of the slope of the actuating surface of the valve actuator 19.

As shown in FIGS. 3 and 4, a dirty detergent solution bag 46 is removably mounted within the casing 16 in a position to receive dirty detergent solution from the separator 27. The bag 46 may be made of any suitable water impervious material but is preferably made of flexible material such as a suitable thermoplastic of a kind well known in the art. An eyelet 47 is provided in the side of bag 46 in order to equalize the pressures between the interior of bag 46 and the interior of the container 16.

The bag 46 may be removably supported within the casing 16 in any suitable manner. As shown the bag 46 includes a flared mouth 48 which is held between two supporting rings 49 and 50 which are made of plastic material and may be readily collapsed to remove the bag 46 therefrom and replace it with a new one should that be necessary or desirable. The outer ring 50 is shaped to fit a shouldered recess 51 in the top of the casing 16 for supporting the bag 46 within the container 16. Suitable gaskets 52, 53 may be provided between the mating surfaces of the sections 12 and 13 to provide an airtight seal when the sections are clamped in assembled relationship.

As shown in FIG. 3 the unit is in a vertical position and the level of the clean detergent solution is shown at the point 60 in the position when a portion of the original charge of clean detergent solution has been dispensed and some dirty detergent solution 61 has been collected in the bottom of the collapsible bag 46. The liquid 42 is shown in dotted lines extending upwardly to the level 62 in FIG. 3 and the bag 46 is shown collapsed and floating on top of the liquid 42 to indicate the position of the bag 46 and the liquid level when the container 16 is fully charged with clean detergent solution and no dirty detergent solution has been collected in bag 46.

The squeegee unit 21 includes a squeegee blade 54 which is constructed to collect dirty detergent solution from the floor and deliver it to the suction mouth 55 of nozzle 17 as the device is moved back and forth across the floor. The squeegee unit 21 is detachably secured to the nozzle 17 in any suitable manner. It is adapted to be replaced by the scrubbing unit 22 when the device is to be used for scrubbing purposes.

As shown the scrubbing unit 22 includes a sponge rubber scrubbing pad 56 suitably secured to a backing member 57 which closes the suction mouth 55 of the suction nozzle when the scrubbing attachment 22 is in use.

OPERATION

Assuming that the vessel 16 is charged with clean detergent solution to the dotted line level 62 of FIG. 3, the unit 10 may first be used as a floor scrubber in which case the squeegee unit 21 is removed and the scrubbing unit 22 attached to the nozzle 17. The valve actuator 19 is then moved downwardly to open valve 43 to dispense clean detergent solution from the tube 20. As the device is moved back and forth across the floor the clean detergent solution will be deposited onto the floor to the rear of the scrubbing unit 22 and the scrubbing pad 56 will thoroughly distribute it over the floor whereby the detergent will loosen the dirt and grime from the floor and become a dirty detergent solution. During the scrubbing operation the motor-fan unit is not in operation.

When the scrubbing operation is completed the valve actuator 19 is moved upwardly to permit valve 43 to close under the bias of spring 44 whereby the flow of clean detergent solution from the tube 20 will cease. The flow of clean detergent may be stopped prior to the end of the scrubbing operation when sufficient detergent solution has been dispensed for the purpose. Also the valve 43 may be alternately opened and closed during the scrubbing operation to dispense clean detergent solution as needed.

The device 10 may then be used to remove the dirty detergent solution from the floor. The scrubbing unit 22 is removed and the squeegee unit 21 attached to the suction nozzle, it being noted that the suction mouth 55 is now open. The switch 37 may then be actuated to energize the motor-fan unit 28 whereby a suction or reduced pressure will be produced in the suction passage 26.

The device is then moved across the previously scrubbed floor to remove the dirty detergent solution therefrom. The squeegee unit 21 will collect the dirty water in front of and beneath the nozzle mouth 55 where it will be drawn upwardly into the suction passage 26. The dirty water and detergent will be drawn upwardly from the suction passage 26, through the suction tube 18 and passage 32 into the interior of the separator 27 where the dirty detergent solution will be separated from the air stream and fall into the bag 46. The clean dry air will be drawn into the fan eye 34 and be discharged through the exhaust opening 35 free of water and dirt.

As the clean detergent solution 42 is dispensed from receptacle 16, the liquid level in the receptacle will fall from its original level 62 and the collapsed bag 46 shown in dotted lines in FIG. 3 will follow. As shown in FIG. 3 the liquid level has fallen to the point 60. Then when the dirty detergent solution 61 is collected the bag 46 will assume a position similar to that shown by the full lines of FIG. 3 with the bottom of bag 46 positioned somewhat below the level 60 of the clean detergent solution 42.

While the collapsible bag 46 is shown smaller than the receptacle 16, in actual practice it will be made large enough to substantially fill the interior of receptacle 16 when the bag 46 is substantially full of dirty detergent solution. Thus the complete capacity of the receptacle is used to store clean detergent solution at the start of a scrubbing operation and the same capacity is used to store the dirty detergent solution at the end of a scrubbing operation.

In the drawings the bag 46 is shown smaller than the receptacle 16 in order to better show the relationship of the two receptacles as the detergent solution is dispensed and collected. It is to be understood however that in actual practice the bag 46 will be made large enough to substantially fill the receptacle 16 when filled with liquid.

When the motor-fan unit 28 is in operation a suction will be produced within the bag 46 and in order to keep the bag from collapsing the vent 47 is provided. That in turn will produce a vacuum within the casing 16 which will prevent the flow of detergent solution even though the valve 43 may be inadvertently left open.

The bag 46 should be emptied of dirty water after each usage and for that purpose the hinged casing sections are provided. To remove the bag 46 it is only necessary to unlatch latch 15 and pivot the sections 12 and 13 to position shown in FIG. 4. The bag 46 may then be easily removed, emptied and replaced as shown in FIGS. 3 and 4.

From the foregoing it can be seen that the present invention provides a device which may be used for dispensing a clean detergent solution onto the floor preparatory or during a scrubbing operation, which may be used to scrub the floor either during or after the detergent is applied and which may be thereafter used to remove the dirty detergent solution from the floor.

It is also evident that the device of the present invention provides for the easy removal, emptying and replacement of the dirty water collecting bag of a unitary floor scrubbing appliance in which the dirty water bag is housed within the container provided for dispensing of a clean detergent to the floor to be scrubbed.

It is also evident that the floor scrubber of the present invention comprises two sections hingedly attached to each other and easily separable to provide for the easy removal and replacement of the dirty water collecting bag.

It is also evident that the present invention provides a combined function container in which a clean detergent solution may be stored and dispensed when necessary which includes an easily removable dirty water bag housed within the same container.

While I have shown and described but a single embodiment of my invention it is to be understood that that embodiment is to be taken as illustrative only and not in a limiting sense. I do not wish to be limited to the particular structure shown and described but wish to include all equivalent variations thereof except as limited by the scope of the claims.

I claim:

1. A unitary floor scrubbing and drying appliance comprising, a water pick up suction nozzle for contact with a floor to be scrubbed, suction creating means, a suction line connecting said suction creating means to said nozzle for sucking up dirty detergent from said floor in the suction air stream, an outer open topped receptacle forming a reservoir for clean detergent solution, a detergent dispensing opening adjacent the bottom of said outer receptacle, an inner collapsible receptacle removably mounted on the open top of said outer receptacle and being nested therein, and means in said suction line for supplying dirty detergent solution into said inner receptacle, the arrangement being such that said collapsible receptacle will float on top of liquid in said outer receptacle when said collapsible receptacle is empty so that the bottom of said collapsible receptacle will follow the liquid level in said outer receptacle as liquid is dispensed therefrom, and as liquid is collected in said collapsible receptacle it will occupy the position formerly occupied by the liquid dispensed from said outer receptacle.

2. In a floor scrubber according to claim 1 in which said inner receptacle is in the form of a flexible impervious thermoplastic bag.

3. In a floor scrubber according to claim 2 including a vent opening formed in said bag to equalize air pressures between the interiors of said receptacles.

4. A unitary floor washing and drying appliance comprising, a suction nozzle for contact with a floor to be cleaned, an air pump having a suction inlet, a suction line connecting said suction inlet to said nozzle for picking up liquid from said floor in the suction air stream, a reservoir for cleaning liquid carried by said appliance, means for dispensing liquid from the lower part of said reservoir onto the floor at said nozzle and a dirty water receptacle removably mounted on and nested within the upper end of said reservoir, said suction line including means forming a separable closure for both said reservoir and said receptacle, said closure means being formed to discharge dirty water from said air stream into said receptacle, said receptacle being in the form of a collapsible container of flexible material which when empty floats on top of liquid in said reservoir so that as liquid is dispensed from said reservoir the bottom of said receptacle moves downwardly therewith whereby it occupies the same space formerly occupied by said liquid.

*5. In a unitary floor scrubbing and drying appliance,*

*(a) an outer receptacle mounted on said appliance and forming a reservoir for clean liquid, said outer receptacle having an opening in its top portion and a detergent dispensing opening in its bottom portion,*

*(b) an inner collapsible receptacle mounted within said outer receptacle, said inner receptacle having an inlet opening positioned adjacent said opening in the top portion of said outer receptacle,*

*(c) a water pick up suction nozzle and suction creating means on said appliance, and*

*(d) conduit means connecting said nozzle to said suction creating means and to separator means for supplying dirty liquid picked up through said nozzle to said inner receptacle,*

*(e) the arrangement being such that when said inner collapsible receptacle is empty it is compressed to a collapsed condition by liquid in said outer receptacle and expands to occupy a greater volume in said outer receptacle as liquid is dispensed from said outer receptacle, and as dirty liquid is collected in said inner receptacle it occupys the same space formerly occupied by the liquid dispensed from said outer receptacle.*

*6. The appliance of claim 5 wherein a vent passageway communicates between said inner and outer receptacles to equalize air pressures between the interiors of said receptacles, said vent passageway communicating with the interior of said inner receptacle at the top portion thereof.*

*7. The appliance of claim 6 wherein said inner receptacle is mounted within said outer receptacle by suspension means attached to the periphery of said inlet opening of said inner receptacle, said suspension means being supported adjacent the periphery of said opening in the top portion of said outer receptacle.*

*8. In a unitary floor scrubbing and drying appliance including suction creating means connected through conduit means to a liquid pickup suction nozzle and to air-water separator means having a liquid discharge outlet, said appliance having an outer receptacle mounted thereon to form a reservoir for clean liquid, said outer receptacle having an opening in its top portion and a liquid dispensing opening in its bottom portion, the improvement comprising; an inner collapsible receptacle mounted within said outer receptacle, said inner receptacle having an inlet opening positioned adjacent to and communicating within said opening in the top portion of said outer receptacle, said inlet opening of said inner receptacle being positioned to receive liquid from said liquid discharge outlet of said air-liquid separator, said inner receptacle being collapsible and expansible between a substantially zero capacity condition and a maximum capacity condition which is in excess of one half the capacity of said outer receptacle, said inner receptacle being compressed to a collapsed condition of substantially zero capacity by the pressure of liquid in said outer receptacle when said outer receptacle is filled to capacity with liquid and said inner receptacle is empty, said inner receptacle expanding upon discharge of liquid through said dispensing opening of said outer receptacle whereby liquid collected in said inner receptacle from said discharge outlet of said separator occupies the position formerly occupied by the liquid dispensed from said outer receptacle.*

*9. The appliance of claim 8 and further including a vent opening communicating between the interiors of said inner and outer receptacles to equalize air pressure therebetween, said vent being positioned above the normal liquid capacity of said outer receptacle.*

*10. The appliance of claim 8 wherein said inner receptacle is mounted within said outer receptacle by suspension means attached to the peripheral portion of said inlet opening of said inner receptacle, said suspension means being supported adjacent the periphery of said opening in the top portion of said outer receptacle.*

References Cited by the Examiner

The following references, cited by the Examiner, are of record in the patented file of this patent or the original patent.

UNITED STATES PATENTS

| | | | |
|---|---|---|---|
| 103,498 | 5/1870 | Pohlman. | |
| 642,960 | 2/1900 | Olibborn. | |
| 930,628 | 8/1909 | Squier. | |
| 1,670,934 | 5/1928 | Keefer. | |
| 1,687,283 | 10/1928 | Deutscher | 15—320 |

(Other references on following page)

UNITED STATES PATENTS

| | | | |
|---|---|---|---|
| 1,690,472 | 11/1928 | Breton. | |
| 1,731,767 | 10/1929 | Cramer. | |
| 1,752,882 | 4/1930 | Boutwell. | |
| 1,868,269 | 7/1932 | Beadle. | |
| 1,892,347 | 12/1932 | Jerome | 15—50 |
| 2,097,985 | 11/1937 | Maryott | 222—386.5 |
| 2,153,240 | 4/1939 | Dailey et al. | |
| 2,333,451 | 11/1943 | Sussman et al. | |

| | | | |
|---|---|---|---|
| 2,618,510 | 11/1952 | Mills | 137—564.5 |
| 2,639,005 | 5/1953 | Gerstmann. | |
| 2,678,764 | 5/1954 | Carlson. | |
| 2,693,000 | 11/1954 | Minerley. | |
| 2,758,747 | 8/1956 | Stevens. | |

FOREIGN PATENTS

| | | |
|---|---|---|
| 67,806 | 10/1948 | Denmark. |

ROBERT W. MICHELL, *Primary Examiner.*